Figure 1:
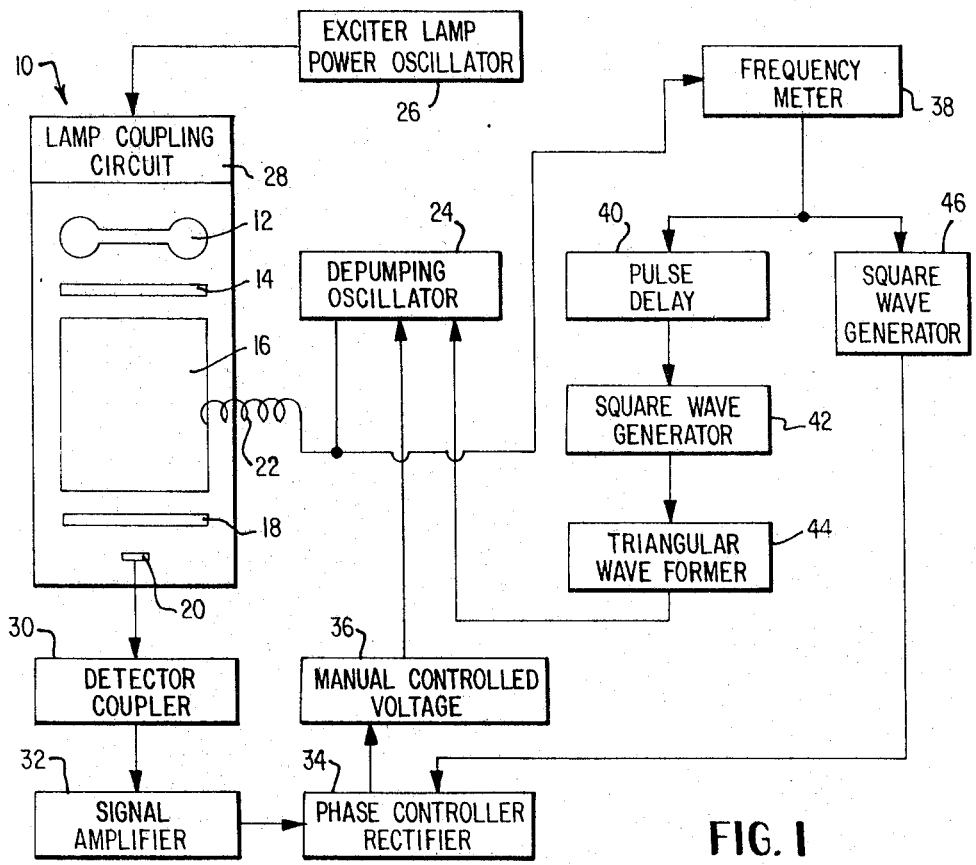

Sept. 16, 1969    D. P. HEARN    3,467,856
OPTICAL RESONANCE MAGNETOMETER WITH DIGITAL
FREQUENCY MEASURING MEANS
Filed Nov. 17, 1966

INVENTOR
DANIEL P. HEARN

BY McLean, Morton & Boustead

ATTORNEYS

# United States Patent Office 3,467,856
Patented Sept. 16, 1969

3,467,856
OPTICAL RESONANCE MAGNETOMETER WITH
DIGITAL FREQUENCY MEASURING MEANS
Daniel P. Hearn, Tulsa, Okla., assignor to Sinclair
Research, Inc., New York, N.Y.
Filed Nov. 17, 1966, Ser. No. 595,166
Int. Cl. G01r *33/08;* H01s *3/05*
U.S. Cl. 324—.5                    4 Claims This invention relates to an improvement in optical magnetometers, and more particularly, to an optical magnetometer wherein the accuracy of the output signal is increased.

The recent advent of high sensitivity optical absorption magnetometers to measure minute fluctuations in the intensity of the earth's magnetic field has greatly expanded the ability of geophysical prospectors to locate and identify subterranean deposits of oil and precious metals. Furthermore, the precision of magnetic field detection by optical absorption magnetometers is so exact that such magnetometers permit airborne exploration of uncharted terrain, thereby greatly increasing both the speed of geophysical exploration and the ability of prospectors to reach remote and inaccessible terrain for geophysical examination.

The optical absorption magnetometer used in the system of this invention can be any one of the family of spin precession magnetometers, e.g., the proton precession magnetometer, the alkali-vapor rubidium and cesium instruments, or, preferably the metastable helium magnetometer. The operation of such magnetometers is dependent upon the quantized nature of the absorption and radiation of energy of the atom. The "planetary" electrons of any atom can exist only in certain specific energy levels. In their lowest or ground state the electrons are stable. However, the electrons can be excited to certain specific and higher energy states by supplying to the system the exact quantity of energy equal to the difference between the higher and the original state. The electron can exist at the higher state for a time which is determined by statistical considerations. As the excited electron returns to a "permissible" lower state the atom radiates an amount of electromagnetic energy equal to the energy difference involved in the transfer. It is significant that the frequency of this radiation is directly proportional to the energy difference.

For purposes of explanations, this invention will be described hereinbelow with reference to the helium metastable magnetometer although it is not so limited but can be used generally with optical absorption magnetometers. Helium is of particular interest in magnetometry because it has atomic excitation states in which the energy differences are particularly suitably for measurement with the aid of recently developed optical pumping methods. In a helium metastable magnetometer the energy necessary to add to the system to cause the atom to rise from the ground state $E_0$ to the highest energized state $E_1$ is $$E_1 - E_0 = h\nu$$

where $h$ is Planck's constant and $\nu$ is the frequency of an activating or energizing light added to the system. This corresponds to the 1.08 micron (10,800 angstrom) line of helium. In falling from the excited state $E_1$ to the metastable state $E_{om}$, the atom is "depumped" and radiates a quantity of light equivalent to $E_1 - {}_1E_{om}$. This light, which represents one of the Zeeman lines of helium, is radiated and lost to the system. Insofar as magnetometry is concerned, it is the remaining energy representing the energy retained in the metastable state $E_{om}$ as compared to the ground state $E_0$ that is significant. It is this energy which corresponds to the difference between two Zeeman states of helium and is directly proportional to the magnetic field strength. It is only necessary to measure this energy to evaluate the magnetic field.

A helium metastable magnetometer logically divides into several separate units; a helium excitation or absorption cell, a light source for excitation, a depumping control oscillator and an excitation light detector and an associated signal amplifier. The helium excitation cell is the basic element of the magnetometer and contains pure helium gas under reduced pressure. In operation, the light source provides light emitted at the excitation frequency of helium which is contained in the helium excitation cell. The depumping oscillator controls the release of helium atoms from the metastable to the ground state. The frequency of this oscillator when adjusted to obtain a maximum "depumping" signal is a measured of the resonance frequency of the metastable state and hence of the average strength of the magnetic field. It should be noted that the frequency of the resonance radiation of the metastable state of helium is not measured directly but indirectly by observing the effectiveness of the depumping oscillator in producing stimulated radiation in that state. The effectiveness is measured by the increase in absorption in the excitation cell of light from the light source after release from the metastable state takes place. The detection of depumping, and thus the precise adjustment of the depumping oscillator frequency is accomplished by the excitation light detector. Each controlled depumping operation is associated with the release of a large quantity of helium atoms from the stored or optically pumped metastable state to the stable state. At each depumping operation the number of atoms in the stable state and hence available for absorption of light at the excitation frequency from the exciter beam abruptly increases. The depumping is, therefore, associated by a decrease in intensity of the beam from the light source for excitation leaving the excitation cell and picked up by the detector. Lead sulfide cells are suitable for use as the detector. The small electrical signals developed in the detector by changes in the exciter beam intensity are then amplified to a useful level and applied to the control circuits including the signal amplifier.

In order to measure the depumping frequency, the frequency of the oscillator is caused to seek the frequency at which maximum depumping occurs and actually to sweep back and forth across a median frequency as it hunts the frequency of maximum depumping. Heretofore, the sweep signal has been started at any point in time and the depumping frequency measured over a given period of time which does not necessarily include an integral number of sweep cycles. In such a system, however, errors are developed as will be shown later. In accordance with this invention a system is profided where the sweep signal is keyed to the frequency measuring intervals and in this manner a measure of the depumping frequency over an integral number of periods of sweep is accomplished.

Figure 2:
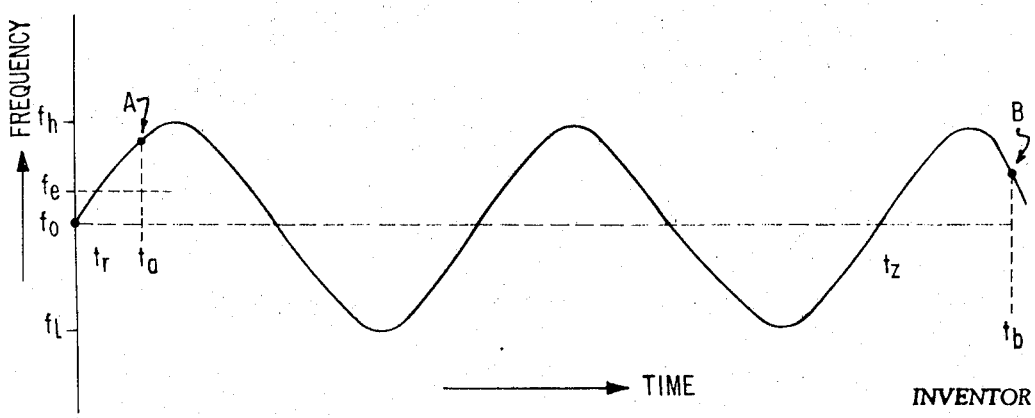

This invention and the objects thereof will be more fully understood from the following detailed description with reference to the attached drawings wherein FIGURE 1 illustrates schematically a magnetometer system in accordance with this invention; and FIGURE 2 illustrates the advantage of this invention in measuring an integral number of periods of sweep.

Referring now to FIGURE 1, helium magnetometer unit 10 generally includes helium exciter lamp 12, circular polarizing lens 14, and absorption, or excitation, cell 16, filter 18, described in more detail hereinbelow, and detector 20. In operation, briefly, exciter lamp 12 emits light at the excitation frequency of helium which is contained in excitation cell 16 and directs this light through cell 16 toward detector 20. Simultaneously, helium atoms in cell 16 are released from the metastable to the ground state, i.e. depumped, by a signal supplied through a depumping coil 22 from an oscillator 24, both described below. The frequency of this signal when adjusted to obtain maximum depumping is a measure of the resonance frequency of the metastable state and hence of the average strength of the magnetic field in which the cell 16 is arranged. Each controlled depumping operation is associated with the release of a large quantity of helium atoms from the metastable to the ground state so that at each depumping operation the number of atoms in the stable state, and hence available for absorption of light from lamp 12, abruptly increases. The depumping is, therefore, associated with a decrease in the intensity of the light beam reaching detector 20. Detector 20 produces an electrical signal corresponding to the light intensity which is then used to control the depumping frequency to obtain maximum depumping so that the frequency is a measure of the earth's magnetic field as described below.

The absorption cell 16 comprises a closed cylindrical vessel containing spectroscopically pure helium gas at a pressure, e.g. 1 to 100 mm. of mercury, such that the metastable helium atoms produced in the discharge having sufficient lifetime to permit an alignment. The helium in the cell is excited to produce atoms in the metastable state by, for example, an electric discharge, produced in the vessel by electrodes (not shown) fitted at each end of the vessel. The electrical discharge strength should be sufficient to maintain a density of metastable atoms in a range of about $10^9$/cubic centimeter to $10^{11}$/cubic centimeter. The cylindrical vessel is fabricated from a material such as glass which is transparent to the helium resonance radiation. If desired, the vessel may be constructed of an opaque material and provided with windows transparent to the resonance radiation. The absorption cell may be of any arbitrary shape, however, the preferred shape is that of the cylinder as shown.

The method of exciting the helium in the absorption cell can, as mentioned, be by means of a direct electric current; however, other means such as a high frequency electric field can be used. If a high frequency field is used, the electrodes referred to above are unnecessary. Another method suitable for producing metastable helium atoms in the absorption cell is through the use of a quantity of natural or artificial radioactive material placed inside or adjacent to the vessel. Additionally, X-rays generated without or within the vessel can be utilized for the production of metastable helium atoms.

The helium excitation lamp 12 is essentially a discharge tube similar in operation to the aforementioned discharge tube, i.e. absorption or excitation cell 16. It comprises a closed vessel, e.g. cylindrical (as shown), dumbbell shaped, etc., which is filled with helium gas and is excited by means of electrodes (not shown) provided at either end of the vessel, for example in the form of electrically conductive coatings on the glass vessel. The lamp 12 is electrically driven by exciter lamp power oscillator 26 through a lamp coupling circuit 28. Since the excitation lamp 12 is used to radiate resonance radiation, it is desired to excite the helium in the lamp 12 much more strongly than in the absorption cell 16. In operation, the helium excitation lamp 12 is energized from power oscillator 26 to radiate unpolarized resonance radiation along a path through the absorption cell 16 which radiation is polarized by means of circular polarizing filter 14.

Detector 20 which monitors the helium resonance radiation transmitted through the absorption cell 16 can be of any of several such devices sensitive to helium resonance radiation, i.e., the 1.08 micron line of helium. Suitable devices are lead sulfide detectors or phototubes. Detector 20 is arranged to receive the helium resonance radiation transmitted through the absorption cell 16.

The electrical signal output of the detector 20 is related to the frequency of the depumping oscillator. It is minimum when the depumping oscillator is set to the precise frequency corresponding to the magnetic field present in the absorption cell 16. Since, however, the absorption cell output signal has several components and the desired signal amounts to only about 0.1% of the total signal, it is desirable to filter the signal and remove noise from the various components such as the power oscillator, etc. Therefore, the output signal from absorption cell 16 is passed through an optical filter 18 which passes only the desired 1.08 micron light signal to detector 20. The detector coupler 30 passes the signal to a signal amplifier 32 where it is filtered to pass only the proper frequency components. The amplified signal is then passed to a phase controlled rectifier 34 which develops an error signal used to control the frequency of the depumping oscillator 24 as described below. The phase controlled rectifier 34 is keyed by a phase reference voltage from frequency meter 38, described below, which measures the frequency of the depumping oscillator.

Referring now to the depumping oscillator 24, oscillator 24 applies a depumping signal to cell 16 through depumping coil 22. The depumping frequency applied to the absorption cell through coil 22 controls release of the helium atoms from the metastable state to the ground state. This frequency, when adjusted to obtain maximum light absorption in the absorption cell, is a measure of the resonance frequency of the metastable state as discussed above and hence of the average strength of the magnetic field being measured. In order to move the depumping oscillator frequency to obtain maximum depumping, the frequency of oscillator 24 is adjusted by a signal from the phase control rectifier 34 which, as mentioned above, develops an error signal used to control this oscillator and keep it at the frequency of maximum depumping.

The error signal from the phase controlled rectifier 34 is first passed through a manually controlled voltage device 36 in the servo feedback loop which sets the general range of operation. During start-up of the magnetometer 10, the manually adjustable voltage signal is first applied to oscillator 24 with the servo loop opened while observing the output of the phase controlled rectifier 34. A point is found in this observation where the phase controlled rectifier 34 output goes from zero to a positive maximum, and then through zero to a negative maximum and back to zero. The point where polarity reverses is that position at which the proper depumping frequency is being used and at this point in the servo loop the device 36 is closed to automatically control the frequency of oscillator 24. Since the construction of such devices is well known, further description is unnecessary.

The output signal from the phase control rectifier 34 is a direct current signal and slowly controls oscillator 24 to adjust the frequency of the oscillator output signal and seek out the proper depumping frequency by continually changing the frequency to obtain maximum depumping of the helium atoms in absorption cell 16 as measured by detector 20.

A second input signal for oscillator 24 is required in order to sense this proper depumping frequency, i.e., the frequency of the output signal of oscillator 24 which is a measure of the strength of the magnetic field. This second input signal for the depumping oscillator 24 rapidly sweeps the frequency back and forth across the median frequency determined by the output signal of rectifier 34. The sweep signal can be provided from an external source and can be of any desired shape, e.g., triangular wave, sine wave, square wave, etc. It is only necessary to move the depumping oscillator frequency both above and below the proper frequency corresponding to the ambient magnetic field in order to sense the point of maximum light absorption in the absorption cell 16 as evidenced by the average output from the phase detector 34. If zero output is not obtained, the error voltage developed will be applied to the depumping oscillator causing it to shift frequency until zero voltage is obtained. It is obvious that the frequency of depumping oscillator 24 is not constant. Its frequency varies slowly, under control of its servo feedback, in response to magnetic field changes, and superimposed on this variation is a small rapid frequency variation due to the application of the sweep signal.

The sweep variation is present only to sense that the output frequency is correct for the ambient magnetic field. Nevertheless, the frequency variations due to the sweep cause an error in frequency determination and in turn in magnetic field measurement in prior art systems. Prior systems in general use a sweep signal which is not precisely related to the beginning and end points of frequency measurement. As a result, the average frequency measured by the counter 38 will not in general be the time average frequency. This may be seen by reference to FIGURE 2 where $f_o$ is the average frequency of the depumping oscillator as controlled by the servo system and is precisely related to the magnetic field. The frequencies $f_l$ and $f_h$ represent the lower and upper limits of frequency which the depumping oscillator reaches as a result of sweep application and $t_a$ and $t_b$ show times at which the frequency measurement could begin and end in the prior systems. The average frequency indicated would then be some value $f_e$ measured from A to B which is not the correct frequency $f_o$ measured from the initiation of operation.

In accordance with the system of this invention, the frequency measurement always encompasses an integral number of sweep cycles and is thus turned on at $t_r$, for instance, and turned off at $t_z$. The average frequency measured in this case would be $f_o$, the true average frequency. It is not necessary that the sweep be sine wave as shown, and it is further not necessary that the measurements of frequency begin and end at $t_r$ as shown in FIGURE 2 in order to derive the benefits of this invention. The frequency measurements may begin at any point in the sweep cycle as long as the measurement encompasses an integral number of sweep cycles. In accordance with this invention the input of frequency meter 38, which is of conventional construction and includes a master time base oscillator and a number of decade dividers which generate measuring time gates synchronized with the time base, is measured across, i.e., averaged across one of these gates. The frequency meter measures the number of cycles in the frequency supplied to it from the depumping oscillator in a given period of time determined by the gate used, since the input to the frequency meter is the output of oscillator 24. The time base divider output from the frequency meter 38 is then utilized to supply the synchronized phase reference voltage signal to the phase controlled rectifier 34 referred to above, by driving square wave generator 46. This phase reference voltage keys the rectifier 34 to pass only those signals which are in phase with this voltage. Since the rectifier 30 is thereby controlled to pass only a narrow band of frequencies the rectifier acts as a filter as well as developing the error signal discussed hereinabove.

In accordance with this invention the time base divider output of frequency meter 38 is also used to control the sweep frequency applied to the depumping oscillator 24. This sweep generating system includes a pulse delay device 40 to which the output of frequency meter 38 is fed which is provided as a system phase adjustment. The delay device 40 is set so that the signal amplifier input to the phase controlled rectifier occurs in phase with the phase reference input from square wave generator 46, the reference generator. The delay could just as well be in the input to square wave generator 46 since the system is periodic.

The output of pulse delay 40 is fed to a square sweep generator, e.g., wave generator 42 which generates the basic sweep signal and the sweep signal is applied to a wave former 44 which produces a sweep signal of the desired shape, e.g., triangular as shown, or of any desirable shape, including square wave, sine wave, etc. Since the sweep signal is alternating current, it sweeps very rapidly back and forth across the depumping frequency. Control of the sweep signal by the output of frequency meter 38 in this manner provides a measure of the depumping frequency over an integral number of periods of sweep. Heretofore, the sweep signal has not been keyed to any frequency measuring intervals but has been started at any point in time and the depumping frequency measured over a time which did not necessarily include an integral number of sweep cycles. In the instant invention, however, the output of the frequency meter insures that the depumping frequency is counted over an integral number of periods since the time base output of the frequency meter 38 is used as the sweep signal to drive and control the sweep signal generator 42 applied to the depumping oscillator 24. In this construction, the output signal of detector 20 is in phase with the frequency variations of the depumping oscillator 24 as caused by the sweep voltage from the frequency meter 38. Therefore, by using the signal from the frequency meter 38 to cause the sweep voltage to move back and forth and by simultaneously using the output of frequency meter 38 to control the phase control rectifier 34 as a reference voltage, the oscillator 24 is always in phase with the counter 38 and an integral number of periods of sweep is always used during any counting period for measuring the frequency of the depumping oscillator in depumping coil 22. Square wave generator 46 provides the phase reference voltage input for rectifier 34.

It is claimed:

1. In a device for measuring the strength of a magnetic field comprising a contained body of optically excitable atoms which are acted upon by said magnetic field when in the presence thereof; a source of resonance radiation impingeable upon and interacting with said body for producing alignment of said atoms contained therein; means to create and direct into said body a radio frequency magnetic field of such frequency as to diminish the alignment of atoms contained in said body including a variable control oscillator; and electrical means to measure the changes in the amount of resonance radiation absorbed by said atoms including a radiation detector, the improvement wherein said electrical means includes means for measuring said frequency over an integral number of sweep cycles comprising frequency counting means having as an input the output of said variable oscillator, means for sweeping the frequency of said variable control oscillator and synchronizing means for synchronizing said sweeping means to said counting means for counting said frequency over an integral number of sweep cycles.

2. The improvement of claim 1 wherein said counting means is an electronic frequency counter having means for counting the number of cycles of input frequency which occur in a given period of time and a plurality of fractional outputs each being a fraction of said period of time, one of said fractional outputs forming said means for sweeping said frequency.

3. The improvement of claim 2 wherein said sweeping means includes a sweep signal generator, said one of the fractional outputs being the input to said sweep signal generator.

4. The improvement of claim 2 further including phase control rectifying means, the output of said detector being connected as the input to said rectifying means, the output of said frequency counter being connected as an input to said rectifying means to key said rectifying means and provide as an output an error signal, said error signal being connected therefrom as an input to said variable oscillator to vary said frequency and obtain maximum absorption of radiation.

References Cited
UNITED STATES PATENTS 3,174,099 3/1965 Larson _____ 324—0.5
3,249,855 5/1966 Bladen _____ 324—0.5

OTHER REFERENCES

Electronics, v. 33, No. 15. Apr. 8, 1960 pp. 55–58.
I.R.E. International Convention Record, v. 9, pt. 9, March 1961, pp. 244–248.

RUDOLPH V. ROLINEC, Primary Examiner

M. J. LYNCH, Assistant Examiner

U.S. Cl. X.R.

324—79